United States Patent
Okamoto et al.

(10) Patent No.: US 7,169,867 B2
(45) Date of Patent: Jan. 30, 2007

(54) CATALYST FOR BULK POLYMERIZATION

(75) Inventors: Syuji Okamoto, Sayama (JP); Hiroshi Ueno, Sayama (JP)

(73) Assignee: Soken Chemical & Engineering Co., Ltd., Tokyo (JP)

(*) Notice: Subject to any disclaimer, the term of this patent is extended or adjusted under 35 U.S.C. 154(b) by 192 days.

(21) Appl. No.: 11/068,113

(22) Filed: Feb. 28, 2005

(65) Prior Publication Data

US 2005/0143545 A1    Jun. 30, 2005

Related U.S. Application Data

(62) Division of application No. 10/779,840, filed on Feb. 17, 2004, now abandoned, which is a division of application No. 09/553,981, filed on Apr. 20, 2000, now Pat. No. 6,806,331.

(51) Int. Cl.
*C08F 2/38* (2006.01)
(52) U.S. Cl. .............. 526/224; 526/84; 526/85; 526/222; 526/317.1; 526/318; 526/318.4; 526/319; 526/320; 526/328.5
(58) Field of Classification Search ............ 526/84, 526/85, 222, 224, 317.1, 318, 318.4, 319, 526/320, 328.5
See application file for complete search history.

(56) References Cited

U.S. PATENT DOCUMENTS

| | | | |
|---|---|---|---|
| 3,960,824 A | 6/1976 | Hicks | |
| 3,961,957 A | 6/1976 | Kramp et al. | |
| 4,141,934 A | 2/1979 | Wingler et al. | |
| 4,585,844 A | 4/1986 | Wilkinson | |
| 5,574,117 A | 11/1996 | Yoshida et al. | |
| 5,596,051 A | 1/1997 | Jahns et al. | |
| 5,929,278 A | 7/1999 | Campbell et al. | |

FOREIGN PATENT DOCUMENTS

| | | |
|---|---|---|
| JP | 55-000401 B2 | 1/1980 |
| JP | 2582510 B2 | 2/1997 |

*Primary Examiner*—Helen L. Pezzuto
(74) *Attorney, Agent, or Firm*—The Webb Law Firm

(57) ABSTRACT

A catalyst for bulk polymerization of a polymerizable unsaturated compound of the invention comprises a compound having at least one thiol group and a secondary hydroxyl group and represented by the following formula (I):

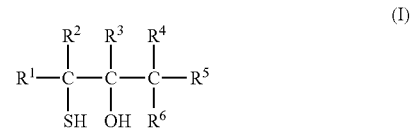

wherein $R^1$ to $R^5$ are each a hydrogen atom or an alkyl group, and $R^6$ is a hydroxyl group, an alkyl group or the like. Also a process for bulk polymerization of the invention comprises polymerizing a polymerizable unsaturated compound in an inert gas atmosphere substantially in the absence of a solvent using, as a catalyst, a compound having at least one thiol group and a secondary hydroxyl group and represented by the above formula (I). According to the catalyst or the process of the invention, bulk polymerization can be carried out in one-component catalyst system in a high yield without suffering a runaway reaction.

2 Claims, No Drawings

CATALYST FOR BULK POLYMERIZATION

CROSS-REFERENCE TO RELATED APPLICATIONS

This application is a division of U.S. patent application Ser. No. 10/779,840, filed Feb. 17, 2004, now abandoned, which is a division of U.S. patent application Ser. No. 09/553,981 filed Apr. 20, 2000, now U.S. Pat. No. 6,806,331.

FIELD OF THE INVENTION

The present invention relates to a novel catalyst used for bulk polymerization of a polymerizable compound having a polymerizable double bond and to a process for bulk polymerization using the catalyst.

BACKGROUND OF THE INVENTION

As processes for radical polymerization of polymerizable compounds having a polymerizable double bond, such as acrylic acid, methacrylic acid and their derivatives, emulsion polymerization, suspension polymerization, solution polymerization and bulk polymerization are known. Of these processes, emulsion polymerization, suspension polymerization and solution polymerization are carried out by dissolving or dispersing a reactive compound in a reaction solvent so that they are advantageous in that the polymerization temperature can be easily controlled and the reaction solution has flowability even when the conversion (polymerization ratio) is high.

In the emulsion polymerization and the suspension polymerization, however, operations to separate the resulting polymer from a dispersion medium, such as precipitation, filtration, washing and drying, are necessary, so that the process becomes complicated. Moreover, it is difficult to completely remove a dispersant or an emulsifying agent used in the polymerization process from the polymer, so that the residual emulsifying agent or dispersant may adversely affect the properties inherent in the polymer, such as water resistance or strength, and may also exert an undesirable influence on the processability when the polymer is mixed or kneaded with other substances or modified with other substances. The solution polymerization process is advantageous in that the temperature of the polymerization reaction can be easily controlled because a large amount of an organic solvent is used and that designing of a polymer can be relatively easily made because of its homogeneous reaction system. This process, however, has a problem in that there is a great difference in the monomer concentration between the initial stage and the later stage of the polymerization. As a result, a large proportion of a low-molecular weight polymer is produced and the molecular weight distribution is widened. In order to solve the problem, a method of adding a monomer by portions or a method of adding a monomer dropwise has been attempted. By the use of such a method, however, an advantage of the solution polymerization, i.e., simple reaction process, is impaired.

In case of a polymerization reaction associated with chain transfer, the organic solvent used as a reaction solvent in the solution polymerization generally participates in the polymerization reaction such as termination reaction or chain transfer reaction, so that the presence of the organic solvent complicates designing of a polymer.

In addition, the polymer obtained by the solution polymerization contains a large amount of an organic solvent. In the use of the polymer, therefore, it is necessary to remove a large amount of the organic solvent used in the reaction, and as a result, the productivity becomes low. Moreover, if the polymer solution is used outdoors as it is, the organic solvent evaporates and exerts an adverse effect on the natural environment.

In contract therewith, bulk polymerization uses no solvent, so that it is unnecessary to use an organic solvent, a dispersant, an emulsifying agent or the like, and any impurity (e.g., organic solvent) which participates in the polymerization reaction is not contained in the reaction system. Therefore, not only does the reaction system become simplified but also the resulting polymer is free from impurities such as an emulsifying agent and a dispersant. Further, an operation of removing the solvent is unnecessary to obtain the aimed-for polymer. From these viewpoints, bulk polymerization is industrially advantageous.

In the bulk polymerization method, however, the polymerization reaction rate generally is extremely high, and in fact, it is very difficult to control the bulk polymerization reaction. The polymer produced at high temperatures, because of the uncontrollable reaction rate, may have unstable end groups of molecules attributable to disproportionation termination, or the molecular weight of the polymer is lowered. Further, branching or gelation of a polymer is liable to occur due to the hydrogen abstraction from the previously produced polymer. On this account, it becomes difficult to design molecular weight, molecular weight distribution, etc. of the polymer, and besides, designing of a definite molecular structure becomes difficult because of branching of a polymer or production of disproportionation termination terminals. Furthermore, a gel is sometimes produced abruptly and in a large amount, and in the worse case, there is a danger of explosion attributable to a runaway reaction.

Of various monomers, styrene or methyl methacrylate has characteristics of a relatively low polymerization reaction rate, so that its reaction can be controlled even in the case of the bulk polymerization, and methods to control the reaction have been studied for a long time. In the bulk polymerization of styrene or methyl methacrylate, a mercaptan is sometimes used to regulate the molecular weight or the molecular weight distribution.

For example, it is known that, in the bulk polymerization of a styrene type unsaturated compound (e.g., styrene) whose reaction proceeds relatively mildly, a mercaptan is used to control the progress of the bulk polymerization reaction. More specifically, Japanese Patent Publication No. 401/1980 discloses "a polymerization process comprising bringing a polymerizable ethylenically unsaturated monomer into contact with an organic mercaptan having at least one thiol group in the presence of oxygen at a temperature-of about 20° C. to about 200° C. for a period of time sufficient to accomplish substantially complete conversion of the monomer into a polymer". In this reaction, presence of oxygen is essential, and bulk polymerization of an ethylene type unsaturated monomer is conducted using a mercaptan, which is the only activator employable in the presence of oxygen, in combination with oxygen. Therefore, this reaction does not effectively proceed in an atmosphere wherein oxygen is absent. Example 6 of this publication discloses that methacrylic acid, hydroxypropyl methacrylate, butyl acrylate and styrene are copolymerized using 1-thioglycerol as a mercaptan under temperature conditions of 85° C. to 140° C., substantially 140° C., with introducing air. In the bulk polymerization described in this publication, the mercaptan is used together with oxygen, that is, a mercaptan and oxygen are shown as essential substances to initiate polymerization, and there is no description of the use of a mercaptan alone as a polymerization catalyst for an ethylene type unsaturated compound. However, if the mercaptan described in this publication and oxygen are used as polymerization catalysts, oxygen is positively blown into the reaction system, so that there is great danger of explosion or fire in the production of a polymer in a large plant. Even if the production of a polymer is safely made, there is a problem that the resulting polymer may be colored.

In claims of Japanese Patent No, 2,582,510, an invention of "a-process for producing an acrylic polymer, comprising bulk polymerizing a monomer component containing an acrylic acid monomer as a main ingredient, wherein the polymerization reaction system for the bulk polymerization of the monomer component is in an inert gas atmosphere, contains a mercaptan and substantially contains no polymerization initiator" is disclosed.

It is described in the above publication that one role of the mercaptan in the invention is molecular regulation, i.e., regulation of molecular weight and molecular weight distribution, and another role thereof is to mildly promote bulk polymerization of the monomer component up to a high conversion and to gently control the polymerization reaction rate when the reaction system substantially contains no initiator. Comparative Example 3 described in the paragraph No. 0032 of the above publication is an experimental example wherein the reaction was conducted without using 30 parts of octyl thioglycolate that is a mercaptan used in Example 1. According to this comparative example, only the polymerizable monomer was heated in a nitrogen atmosphere, then the temperature rose up to 130° C. after 90 minutes from the beginning of the polymerization, and as a result, the monomer could not be polymerized stably and the resulting polymer was in a state of a gel. That is, it can be seen from the comparison between Comparative Example 3 and Example 1 that the polymerization reaction is initiated by the heat of the monomer and the role of octyl thioglycolate used as a mercaptan is to regulate the molecular weight of the resulting polymer and to inhibit rapid progress of the bulk polymerization reaction.

In the conventional bulk polymerization reaction of an unsaturated monomer using a mercaptan, the mercaptan is used to inhibit progress of the bulk polymerization reaction which is liable to run away (that is, the mercaptan is used as a negative catalyst), as described above, and any technical idea to use the mercaptan as a reaction catalyst for bulk polymerizing an unsaturated monomer has not been known so far.

The present invention provides a novel catalyst used for bulk polymerizing a polymerizable unsaturated compound.

The invention further provides a novel catalyst for bulk polymerization, by the use of which a high conversion can be achieved even when a polymerizable unsaturated compound having extremely high reactivity, such as an acrylic acid derivative, is bulk polymerized, the dispersion index of a molecular weight of the resulting polymer can be made small, and hydroxyl groups can be introduced into the resulting polymer.

Still further, the invention provides a process for bulk polymerizing a polymerizable unsaturated compound, wherein the bulk polymerization reaction can be certainly controlled by the use of the above-mentioned catalyst.

SUMMARY OF THE INVENTION

The catalyst for bulk polymerization of a polymerizable unsaturated compound according to the present invention comprises a compound having at least one thiol group and a secondary hydroxyl group and represented by the following formula (I):

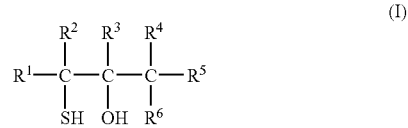

$R^1$ to $R^5$ are each independently a hydrogen atom or an alkyl group of 1 to 12 carbon atoms, and $R^6$ is at least one group selected from a hydroxyl group, an alkoxy group of 1 to 12 carbon atoms and an alkyl group of 1 to 12 carbon atoms.

The process for bulk polymerization according to the present invention comprises polymerizing a polymerizable unsaturated compound in an inert gas atmosphere substantially in the absence of a solvent using, as a catalyst, a compound having at least one thiol group and a secondary hydroxyl group and represented by the following formula (I):

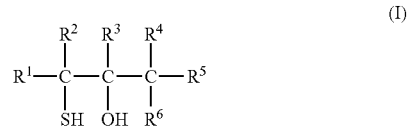

wherein $R^1$ to $R^5$ are each independently a hydrogen atom or an alkyl group of 1 to 12 carbon atoms, and $R^6$ is at least one group selected from a hydroxyl group, an alkoxy group of 1 to 12 carbon atoms and an alkyl group of 1 to 12 carbon atoms.

The catalyst for bulk polymerization according to the invention is a compound having a thiol group (—SH group) and a secondary hydroxyl group in a molecule, as shown by the formula (I). When the compound represented by the formula (I) is used as a catalyst for bulk polymerization, the bulk polymerization can be stably carried out without suffering a runaway reaction and the molecular weight distribution of the resulting polymer can be narrowed. That is, even when a monomer having extremely high reactivity, such as acrylic acid or its derivative, is polymerized, the polymerization reaction can be carried out with favorably controlling the reaction by the use of the compound having a thiol group and a secondary hydroxyl group in a molecule. In this reaction, a reaction initiator is not used, and the compound represented by the formula (I) functions not only as a reaction catalyst but also as a control agent to prevent runaway of the reaction. Accordingly, if the compound represented by the formula (I) is used as a catalyst for bulk polymerization reaction, any other reaction initiator such as oxygen does not need to be present in the reaction system, and besides two-step polymerization using other reaction initiator does not need to be carried out.

By the use of the compound of the formula (I) as a catalyst, further, runaway of the reaction can be prevented and the bulk polymerization reaction can be carried out under mild conditions. Therefore, an unexpected polymerization product such as a gel is scarcely produced. Although the reaction mechanism in the bulk polymerization using this catalyst is not always clear, the catalyst exerts specific action and effect such that hydroxyl groups are introduced into a polymer produced by the use of the catalyst. More specifically, in the polymer produced by the use of the catalyst, "—SR groups" and the like are attached to the molecular terminals of the polymer in an extremely large proportion, and the thus produced polymer has a significant hydroxyl number (OHV) attributable to the hydroxyl groups in the catalyst. Unlike a conventional mercaptan, the catalyst of the invention is not a negative catalyst that inhibits a reaction, and can promote the bulk polymerization reaction without using any other polymerization initiator. By the use of the compound represented by the formula (I), furthermore, the bulk polymerization reaction can be promoted mildly.

DETAILED DESCRIPTION OF THE INVENTION

The catalyst for bulk polymerization (bulk polymerization catalyst) according to the invention and the process for bulk polymerization (bulk polymerization process) using the catalyst are described in detail hereinafter.

The catalyst of the invention comprises a compound having at least one thiol group and a secondary hydroxyl group and represented by the following formula (I).

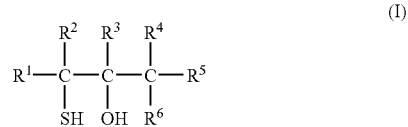

In the formula (I), $R^1$ to $R^5$ are each independently a hydrogen atom or an alkyl group of 1 to 12 carbon atoms, preferably 1 to 5 carbon atoms. Examples of the alkyl groups include methyl, ethyl, propyl, isopropyl, butyl, isobutyl and pentyl. $R^1$ to $R^5$ are each particularly preferably a hydrogen atom. In the formula (I), $R^6$ is at least one group selected from a hydroxyl group, an alkoxy group of 1 to 12 carbon atoms and an alkyl group of 1 to 12 carbon atoms. The alkoxy group is preferably an alkoxy group of 1 to 4 carbon atoms, and examples thereof include methoxy, ethoxy, propoxy and butoxy. The alkyl group is preferably an alkyl group of 1 to 5 carbon atoms, and examples thereof include methyl, ethyl, propyl, butyl and pentyl. In the present invention, $R^6$ is particularly preferably a hydroxyl group.

Examples of the compounds represented by the formula (I) employable in the invention include thioglycerol (1-thioglycerol), 1-mercapto-2,3-propanediol, 2-mercapto-3-butanol, 2-mercapto-3,4-butanediol, 1-mercapto-2,3-butanediol, 1-mercapto-2-butanol, 2-mercapto-3,4,4'-butanetriol, 1-mercapto-3,4-butanediol and 1-mercapto-3,4,4'-butanetriol. These compounds are useful as bulk polymerization catalysts, and of these, thioglycerol is most useful as a bulk polymerization catalyst.

The compound represented by the formula (I) has both of a thiol group (—SH) and a secondary hydroxyl group (—OH) in one molecule.

In order to use the compound as the bulk polymerization catalyst of the invention, the compound is required to have a thiol group and a secondary hydroxyl group both present in one molecule. A compound which is sometimes used for bulk polymerization, such as octyl thioglycolate, has a thiol group in a molecule but has no hydroxyl group therein. If the compound having a thiol group but having no hydroxyl group in one molecule, e.g., is allowed to-be present in the bulk polymerization reaction of an acrylic acid derivative, this compound acts as a negative catalyst for the bulk polymerization reaction to inhibit a progress of the reaction, and scarcely has a function of promoting the bulk polymerization reaction when used alone. Accordingly, for the catalyst used in the bulk polymerization, it is very important that the hydroxyl group present in a molecule is a secondary hydroxyl group. It is presumed that, in the compound having a secondary hydroxyl group and a thiol group both present in one molecule, the hydrogen atom for constituting the thiol group is attracted to the secondary hydroxyl group to initiate the reaction. For this reason, the compound used as the bulk polymerization catalyst of the invention is required to have a thiol group and a secondary hydroxyl group both present in one molecule.

In the present invention, if the compound represented by the formula (I) is allowed to be present together with a polymerizable unsaturated compound and if the unsaturated compound is reacted in an atmosphere of an inert gas such as a nitrogen gas or an argon gas, the compound represented by the formula (I) acts as a catalyst for promoting the bulk polymerization reaction in the bulk polymerization process. Even when a polymerizable unsaturated compound whose bulk polymerization reaction rate can be hardly controlled, such as an acrylic ester, is used, the bulk polymerization reaction of the polymerizable unsaturated compound can be promoted at a controllable reaction rate by virtue of the catalytic action. In the bulk polymerization using the compound represented by the formula (I) as a catalyst, if oxygen is present in the reaction system, the catalytic action inherent in the compound represented by the formula (I) is inhibited. In the use of the compound of the formula (I) as a catalyst, therefore, the reaction system should be purged with an inert gas.

The polymerization product obtained by the bulk polymerization using the catalyst of the invention has a hydroxyl number (OHV) presumably attributable to the hydroxyl groups of the catalyst used, independent of the type of the starting monomer. Further, to the molecular terminals of the polymer obtained by the bulk polymerization using the compound represented by the formula (I), an extremely large number of —SR groups are introduced.

Next, the bulk polymerization process using the compound represented by the formula (I) as a catalyst is described.

The bulk polymerization process of the invention comprises polymerizing a polymerizable unsaturated compound in an inert gas atmosphere substantially in the absence of a solvent using, as a catalyst, a compound having at least one thiol group and a secondary hydroxyl group and represented by the following formula (I).

The compound used as the catalyst in the bulk polymerization process of the invention has at least one thiol group and a secondary hydroxyl group and is represented by the following formula (I).

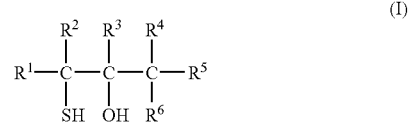

In the formula (I), $R^1$ to $R^6$ have the same meanings as previously described.

The monomer used in the bulk polymerization using the above compound is a polymerizable unsaturated compound and has an ethylenically unsaturated double bond.

The polymerizable unsaturated compound is, for example, a vinyl group-containing compound. Specific examples of the polymerizable unsaturated compounds include:

acrylic acid and salts thereof such as alkali metal salts thereof;

methacrylic acid and salts thereof such as alkali metal salts thereof;

acrylic alkyl esters, such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

acrylic aryl esters, such as phenyl acrylate and benzyl acrylate;

acrylic alkoxyalkyl esters, such as methoxyethyl acrylate, ethoxyethyl acrylate, propoxyethyl acrylate, butoxyethyl acrylate and ethoxypropyl acrylate;

methacrylic alkyl esters, such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

methacrylic aryl esters, such as phenyl methacrylate and benzyl methacrylate;

methacrylic alkoxyalkyl esters, such as methoxyethyl methacrylate, ethoxyethyl methacrylate, propoxyethyl methacrylate, butoxyethyl methacrylate and ethoxypropyl methacrylate;

diacrylic esters of (poly)alkylene glycols, such as diacrylic ester of ethylene glycol, diacrylic ester of diethylene glycol, diacrylic ester of triethylene glycol, diacrylic ester of polyethylene glycol, diacrylic ester of propylene glycol, diacrylic ester of dipropylene glycol and diacrylic ester of tripropylene glycol;

dimethacrylic esters of (poly)alkylene glycols, such as dimethacrylic ester of ethylene glycol, dimethacrylic ester of diethylene glycol, dimethacrylic ester of triethylene glycol, dimethacrylic ester of polyethylene glycol, dimethacrylic ester of propylene glycol, dinmethacrylic ester of dipropylene glycol and dimethacrylic ester of tripropylene glycol;

polyacrylic esters, such as trimethylolpropane triacrylate;

polymethacrylic esters, such as trimethylolpropane trimethacrylate;

acrylonitrile;

methacrylonitrile;

vinyl acetate;

vinylidene chloride;

halogenated vinyl compounds, such as 2-chloroethyl acrylate and 2-chloroethyl methacrylate;.

acrylic esters of alicyclic alcohols, such as cyclohexyl acrylate;

methacrylic esters of alicyclic alcohols, such as cyclohexyl methacrylate;

oxazoline group-containing polymerizable compounds, such as 2-vinyl-2-oxazoline, 2-vinyl-5-methyl-2-oxazoline and 2-isopropenyl-2-oxazoline;

aziridine group-containing polymerizable compounds, such as acryloyl aziridine, methacryloyl aziridine, 2-aziridinylethyl acrylate and 2-aziridinylethyl methacrylate;

epoxy group-containing vinyl monomers, such as allyl glycidyl ether, acrylic glycidyl ether, methacrylic glycidyl ether, acrylic 2-ethylglycidyl ether and methacrylic 2-ethylglycidyl ether;

hydroxyl group-containing vinyl compounds, such as 2-hydroxyethyl acrylate, 2-hydroxyethyl methacrylate, 2-hydroxypropyl acrylate, monoester of acrylic acid or methacrylic acid and polypropylene glycol or polyethylene glycol, and adducts of lactones and 2-hydroxyethyl (meth) acrylate;

fluorine-containing vinyl monomers, such as fluorine-substituted methacrylic alkyl esters and fluorine-substituted acrylic alkyl esters;

unsaturated carboxylic acids except (meth) acrylic acid, such as itaconic acid, crotonic acid, maleic acid and fumaric acid, salts thereof, (partial) esterification products thereof, and acid anhydrides thereof;

reactive halogen-containing vinyl monomers, such as 2-chloroethyl vinyl ether and vinyl monochloroacetate;

amido group-containing vinyl monomers, such as methacrylamide, N-methylolmethacrylamide, N-methoxyethylmethacrylamide and N-butoxymethylmethacrylamide;

organosilicon group-containing vinyl compound monomers, such as vinyltrimethoxysilane, γ-methacryloxypropyltrimethoxysilane, allyltrimethoxysilane, trimethoxysilylpropylallylamine and 2-methoxyethoxytrimethoxysilane; and diene compounds, such as ethylidene norbornene, piperazine, isoprene, pentadiene, vinylcyclohexene, chloroprene, butadiene, methylbutadiene, cyclobutadiene and methylbutadiene.

Also employable are macromonomers obtained by polymerizing vinyl group-containing compounds and having a radical-polymerizable vinyl group at the molecular terminal, such as a fluorine type monomer, a silicon-containing monomer, a macromonomer, styrene and silicone.

The polymerizable unsaturated compounds mentioned above can be used singly or in combination. Although the polymerizable unsaturated compound may be in the form of a liquid, a solid or a gas under the reaction conditions, it is preferably used as a liquid from the viewpoint of a simple and easy operation.

The polymerization process of the invention is a bulk polymerization process, and the bulk polymerization reaction is carried out substantially in the absence of a solvent. The expression "substantially in the absence of a solvent" means that a reaction solvent is not used, and is not intended to exclude an extremely small amount of a solvent used for homogeneously dispersing the compound represented by the formula (I) in the whole monomer or a solvent remaining in the starting material.

The bulk polymerization reaction of the invention is carried out in an inert gas atmosphere, and therefore an active gas such as oxygen is not present in the reaction system. Examples of the inert gases employable herein include a nitrogen gas, an argon gas, a helium gas and a carbonic acid gas.

In the bulk polymerization, the compound represented by the formula (I) can be used in a catalytic amount commonly adopted, and in general, this compound is used in an amount of 0.1 to 50 mol, preferably 0.5 to 35 mol, in terms of the thiol group, based on 100 of the number of moles of the unsaturated groups in the polymerizable unsaturated compound. If the compound is used in an amount of less than 0.1 mol in terms of the thiol group based on 100 of the number of moles of the unsaturated groups, an effect of initiating the reaction is not sufficiently exhibited. Especially in the case of a compound having a stable unsaturated group, such as a styrene type unsaturated compound, the compound is preferably used in an amount of not less than 0.5 mol in terms of the thiol group based on 100 of the number of the moles of the unsaturated groups. If the compound is used in an amount of more than 50 mol in terms of the thiol group based on the 100 of the number of moles of the unsaturated groups, an abrupt addition reaction of the polymerizable unsaturated compound takes place predominantly, and hence, not only any polymer having sufficient degree of polymerization cannot be obtained but also it becomes difficult to maintain the reaction because of marked generation of heat. If a compound having an unsaturated group of high reactivity, such as an acrylic ester type polymerizable unsaturated compound, is used in an amount of more than 35 mol in terms of the thiol group based on the 100 of the number of moles of the unsaturated groups, an abrupt reaction takes place to cause marked generation of heat, so that it becomes difficult to maintain the reaction.

By the use of the compound represented by the formula (I) alone, bulk polymerization of the polymerizable unsaturated compound proceeds favorably, but a reaction initiator heretofore used is employable in addition to the compound represented by the formula (I). Even when the reaction initiator is used in combination, the bulk polymerization of the invention smoothly proceeds without suffering a runaway reaction.

Although the bulk polymerization reaction can be carried out with heating, warming or cooling according to the type of the polymerizable unsaturated compound, the bulk polymerization reaction temperature is preferably set in the range of 0 to 150° C., particularly preferably 25 to 120° C. When the bulk polymerization reaction temperature is set in the above range, the compound represented by the formula (I) can efficiently function as a positive catalyst. The reaction temperature depends upon the activity of the unsaturated group of the polymerizable unsaturated compound used. However, even in the use of an acrylic ester type polymerizable unsaturated compound having relatively high polymerizability, if the reaction temperature is set at lower than 0° C., the catalytic activity of the compound represented by the formula (I) decreases, and a long period of time is required to obtain a sufficient conversion, resulting in bad efficiency. On the other hand, even in the use of a compound having low polymerizability, such as styrene type unsaturated compound, a satisfactory conversion can be obtained as far as the reaction temperature is not lower than 25° C. If the reaction temperature is higher than 150° C., an acrylic ester type unsaturated compound also undergoes a thermally initiated polymerization reaction, resulting in a polymer produced by the thermally initiated polymerization other than a polymer produced by the use of the compound represented by the formula (I) as a catalyst. That is, the aimed polymer is not obtained. Moreover, there is a danger of a runaway reaction attributable to the marked generation of heat in the polymerization process. By setting the polymerization reaction temperature at not higher than 120° C., a polymer produced by the proper catalytic action of the compound represented by the formula (I) can be efficiently obtained, and the progress of the reaction can be maintained without runaway of the reaction.

The bulk polymerization reaction of the invention using the compound represented by the formula (I) as a catalyst presumably proceeds in the following manner, taking the case of thioglycerol (3-mercapto-1,2-propanediol), though it is not a conclusion.

Initiation:

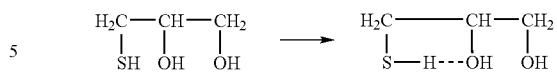

Addition:

(Propagation)

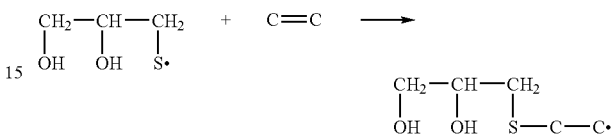

Chain transfer:

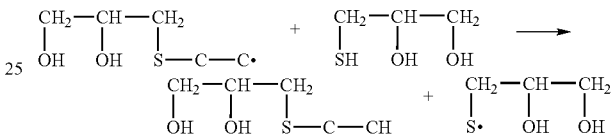

Termination:

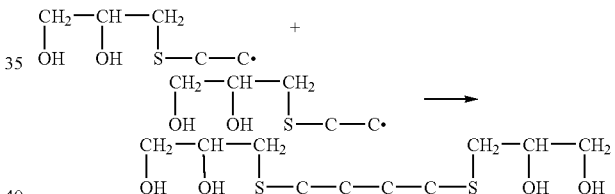

(Termination of coupling)

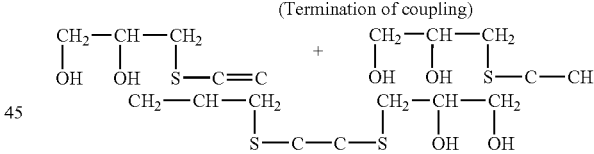

(Reaction with TGC)

That is, the polymerization reaction presumably proceeds as follows. As shown in the above illustration, the hydrogen atom of the thiol group in the thioglycerol having a SH group and a secondary hydroxyl group in a molecule is attracted to the secondary hydroxyl group in the initial stage to produce a thio radical (.S radical), and through radical addition of the thio radical to the polymerizable unsaturated compound, an initial-stage polymerization reaction is initiated. Then, a chain transfer reaction of the thioglycerol and the unsaturated compound and a propagation reaction proceed. Termination of the reaction is attributed to termination of the chain transfer of the thioglycerol, termination of recombination of radicals with each other and termination of recombination of a propagation radical with the thioglycerol radical present as a thio radical. In this case, the thioglycerol radical having been subjected to hydrogen abstraction by the chain transfer sometimes becomes an initiation terminal to be added as a monomer or is sometimes recombined with a propagation radical and is added to polymer terminal as a termination agent.

The thioglycerol thus introduced as the initiation terminal or the termination-terminal has hydroxyl group, so that the hydroxyl group is introduced to the molecular terminal of the polymer produced by the process of the invention. That is, since thioglycerol has two hydroxyl groups in a molecule, a polyfunctional hydroxyl group-containing polymer having a molecular structure wherein two or four hydroxyl groups are introduced to the initiation terminals or the initiation terminals and the termination terminals of the resulting polymer is obtained.

Accordingly, the polymer obtained by the bulk polymerization process of the invention have hydroxyl groups derived from the compound represented by the formula (I), and has an inherent hydroxyl number (OHV) according to the type and the amount of the catalyst used. The hydroxyl group introduced to the molecular terminal has reactivity similar to that of an ordinary hydroxyl group and can react with, for example, a compound having an isocyanate group to form a urethane bond or can react with an acid chloride group or a carboxyl group to form an ester bond. Therefore, the polymer obtained by the bulk polymerization process of the invention is apt to react with a polyfunctional compound having a polyfunctional group capable of reacting with this hydroxyl group to form a crosslinked structure.

By the use of the compound represented by the formula (I) as a catalyst, the conversion in the bulk polymerization reaction becomes usually not less than 50%, preferably not less than 70%. Even when a polymerizable unsaturated compound having high reactivity such as an acrylic ester is used, no runaway reaction takes place and the bulk polymerization reaction can be stably carried out by the use of the compound represented by the formula (I) as a catalyst, though such a high conversion is obtained.

The number-average molecular weight of the bulk polymer (including a composition) produced as above is in the range of usually 500 to 100000, preferably 1000 to 10000, and the weight-average molecular weight thereof is in the range of 1000 to 300000, preferably 1000 to 100000, though they vary depending upon the type of the polymerizable unsaturated compound used and the type and the amount of the catalyst represented by the formula (I).

The bulk polymer obtained as above is then purified, if necessary, and is used in a way similar to that for an ordinary polymer.

The bulk polymerization catalyst of the invention can be effectively used as a catalyst for bulk polymerization of a polymerizable unsaturated compound. By the use of the bulk polymerization catalyst, bulk polymerization can be carried out under mild conditions without suffering a runaway reaction even if oxygen or any other polymerization initiator is not used. By the use of the bulk polymerization catalyst of the invention, further, a polymer can be obtained in a high yield. By the use of the catalyst, further, hydroxyl groups can be introduced into at least a part of molecules of the resulting polymer.

According to the bulk polymerization process of the invention, bulk polymerization can be smoothly carried out without a runaway of the reaction even in the use of a high-reactivity compound (e.g., acrylic ester) whose bulk polymerization reaction can be hardly controlled by the conventional process because of high reaction rate.

According to the bulk polymerization process of the invention, further, it is possible to introduce hydroxyl groups to the molecular terminals of the resulting polymer.

EXAMPLES

The present invention is further described with reference to the following examples, but it should be construed that the invention is in no way limited to those examples.

Example 1

A flask equipped with a stirrer, a nitrogen gas feed tube, a thermometer and a reflux condenser was charged with 100 parts by weight of butyl acrylate. To the flask was fed a nitrogen gas to replace air in the flask with the nitrogen gas. Then, while further feeding a nitrogen gas, the content in the flask was slowly heated to a temperature of 60° C.

To the flask, 5 parts by weight of thioglycerol into which a nitrogen gas had been thoroughly bubbled was added as a catalyst with stirring.

After the addition of thioglycerol, the reaction was conducted for 4 hours, while the content in the flask was cooled or heated with stirring so that the temperature of the content was maintained at 60° C.

After a lapse of 4 hours, the temperature of the reaction product was returned to room temperature, and 20 parts by weight of a benzoquinone solution (5 wt % solution of benzoquinone in THF) was added to the reaction product to terminate the polymerization.

The thus obtained THF solution of the reaction product was measured on the residues of the monomer by means of gas chromatography to determine a conversion. As a result, the conversion was 75%, and no runaway reaction was observed in the polymerization.

Example 2

A flask equipped with a stirrer, a nitrogen gas feed tube, a thermometer and a reflux condenser was purged with a nitrogen gas. Then, the flask was charged with 1200 parts by weight of ethyl methacrylate, 225 parts by weight of methyl methacrylate, 75 parts by weight of hydroxyethyl methacrylate and 16 parts by weight of thioglycerol, followed by stirring. The resulting mixture was heated up to 70° C. under stirring, with gently bubbling a nitrogen gas into the mixture. At this temperature, the polymerization reaction was continued for 4 hours.

After a lapse of 4 hours, the temperature of the reaction product was returned to room temperature, and 10 parts by weight of the same benzoquinone solution as used in Example 1 was added to the reaction product to terminate the polymerization.

The thus obtained THF solution of the reaction product was measured on the residues of the monomer by means of gas chromatography to determine a conversion. As a result, the conversion was 60%, and no runaway reaction was observed in the polymerization.

Example 3

A flask equipped with a stirrer, a nitrogen gas feed tube, a thermometer and a reflux condenser was charged with 100 parts by weight of ethyl acrylate. To the flask was fed a nitrogen gas to replace air in the flask with the nitrogen gas. Then, with further feeding a nitrogen gas, the content in the flask was slowly heated to a temperature of 75° C.

To the flask, 8 parts by weight of thioglycerol into which a nitrogen gas had been thoroughly bubbled was added as a catalyst with stirring.

After the addition of thioglycerol, the reaction was conducted for 6 hours, while the content in the flask was cooled or heated with stirring so that the temperature of the content was maintained at 75° C.

After a lapse of 6 hours, the temperature of the reaction product was returned to room temperature, and 20 parts by weight of a benzoquinone solution (5 wt % solution of benzoquinone in THF) was added to the reaction product to terminate the polymerization.

The thus obtained THF solution of the reaction product was measured on the residues of the monomer by means of gas chromatography to determined a conversion. As a result, the conversion was 72%, and no runaway reaction was observed in the polymerization.

Then, the reaction product was transferred into an evaporator and slowly heated up to 70° C. under reduced pressure to remove THF, the residual monomer and the residual thioglycerol.

The 150° C. heating residue of the obtained polymer was 99.7%.

The polymer was measured on the molecular weight by means of gel permeation chromatography (GPC). As a result, the weight-average molecular weight was 4800, the number-average molecular weight was 2800, and the dispersion-index was 1.7. The viscosity at 23° C. was 11900 mPa·s (11900 centipoise (cps)) The reaction product had a hydroxyl number (OHV: mgKOH/g) of 77.

Comparative Example 1

A flask equipped with a stirrer, a nitrogen gas feed tube, a thermometer and a reflux condenser was purged with a nitrogen gas. Then, the flask was charged with 1200 parts by weight of ethyl methacrylate, 225 parts by weight of methyl methacrylate, 75 parts by weight of hydroxyethyl methacrylate and 30 parts by weight of octyl thioglycolate, followed by stirring. The resulting mixture was heated up to 70° C. under stirring, with gently bubbling a nitrogen gas into the mixture. At this temperature, the polymerization reaction was continued for 4 hours.

After a lapse of 4 hours, the temperature of the reaction product was returned to room temperature, and 10 parts by weight of the same benzoquinone solution as used in Example 1 was added to the reaction product to terminate the polymerization.

The thus obtained THF solution of the reaction product was measured on the residues of the monomer by means of gas chromatography to determine a conversion. As a result, the conversion was 2% that was extremely low.

Comparative Example 2

A flask equipped with a stirrer, a nitrogen gas feed tube, a thermometer and a reflux condenser was charged with 100 parts by weight of ethyl acrylate. The content in the flask was slowly heated to a temperature of 75° C., while air was blown into the flask to fill the flask with air.

Then, to the flask was added 8 parts by weight of thioglycerol as a catalyst with stirring. As a result, the temperature of the reaction system rose so rapidly that the reaction could not be controlled.

What is claimed is:

1. A bulk polymerization composition for producing acrylic polymers having a secondary alcohol at a terminus of the polymer molecule, said polymerization composition comprising:
    (a) an acrylic monomer in an inert gas atmosphere substantially in the absence of an active gas, and substantially in the absence of a solvent; and
    (b) a catalyst having a polymerization initiation ability and having at least one thiol group and a secondary hydroxyl group and represented by formula (I):

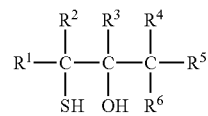

wherein $R^1$ to $R^5$ are each independently a hydrogen atom or an alkyl group of 1 to 12 carbon atoms and $R^6$ is at least one group selected from the group consisting of a hydroxyl group, an alkoxy group of 1 to 12 carbon atoms and an alkyl group of 1 to 12 carbon atoms.

2. The bulk polymerization composition of claim 1, wherein the catalyst represented by formula (I) is thioglycerol.

* * * * *